US007448820B1

(12) United States Patent
Faber

(10) Patent No.: US 7,448,820 B1
(45) Date of Patent: Nov. 11, 2008

(54) INTERNAL CONNECTOR ASSEMBLY FOR TUBULAR MEMBERS

(76) Inventor: Eric B. Faber, P.O. Box 1894, Lexington, KY (US) 40588

( * ) Notice: Subject to any disclaimer, the term of this patent is extended or adjusted under 35 U.S.C. 154(b) by 204 days.

(21) Appl. No.: 11/199,356

(22) Filed: Aug. 8, 2005

Related U.S. Application Data

(60) Provisional application No. 60/599,609, filed on Aug. 7, 2004.

(51) Int. Cl.
*F16B 9/02* (2006.01)

(52) U.S. Cl. ....................... 403/240; 403/231; 403/255; 403/256; 403/260; 403/263; 256/65.08; 256/65.12; 256/73

(58) Field of Classification Search ................. 403/231, 403/240, 252, 254, 255, 256, 258, 259, 260, 403/263, 264, 382, 403; 256/73, 65.08, 65.12; 52/655.1
See application file for complete search history.

(56) References Cited

U.S. PATENT DOCUMENTS

| | | | | |
|---|---|---|---|---|
| 444,960 | A * | 1/1891 | Priday | 256/22 |
| 923,235 | A * | 6/1909 | Adams | 403/240 |
| 2,815,972 | A * | 12/1957 | Lagervall | 403/260 |
| 3,469,869 | A * | 9/1969 | Ramakers | 403/264 |
| 3,471,182 | A * | 10/1969 | Schroer | 403/261 |
| 4,261,665 | A * | 4/1981 | Hsiung | 403/260 |
| 4,981,388 | A * | 1/1991 | Becken et al. | 403/258 |
| 5,500,963 | A * | 3/1996 | Yeh | 403/231 |
| 2005/0008430 | A1 * | 1/2005 | Kahl | 403/231 |

FOREIGN PATENT DOCUMENTS

FR 1.007.385 * 5/1952

OTHER PUBLICATIONS

FR 1.007.385; world.altavista.com translation.*

* cited by examiner

*Primary Examiner*—Michael P Ferguson
(74) *Attorney, Agent, or Firm*—Charles Sherman; Middleton Reutlinger

(57) ABSTRACT

The internal tube connector assembly removeably secures hollow or solid tubes together having any desired angle therebetween and comprises a receiving tube and an extending tube, each having a substantially continuous inside and outside surface. The receiving tube has a greater inner perimeter than an outer perimeter of the extending tube. A securing member having a centrally oriented fastener receiving aperture slidingly extends through apertures in the sidewall of the extending tube. A receiver having an outer surface coincident in shape with the inside surface of the receiving tube, and optionally having a receiving indentation, has a centrally oriented fastener aperture. A fastener removeably extends through the fastener opening in the sidewall of the receiving tube and into the fastener aperture in the receiver, and cooperates with the securing member to removeably secure the receiving tube with the extending tube.

13 Claims, 9 Drawing Sheets

INTERNAL CONNECTOR ASSEMBLY FOR TUBULAR MEMBERS

CROSS-REFERENCE TO RELATED APPLICATIONS

This application claims priority of U.S. provisional patent application Ser. No. 60/599,609, filed Aug. 7, 2004.

BACKGROUND

The device of the present invention relates generally to connector assemblies for tubular members. Tubular members have been used in the construction of a variety of assemblies such as furniture, gates, fences, docks, hand rails, etc. Recently, these tubular members have been comprised of corrosive resistant materials such as polyvinylchloride or aluminum. Typically these tubular members are hollow and necessitate the use of solvent welding and joint sections for joining. These joints are permanent and consequently the replacement of a tubular member in an assembly may become costly and/or labor intensive.

DETAILED DESCRIPTION

The following description describes the internal connector assembly of the instant invention. In the following description, numerous specific details and options are set forth in order to provide a more thorough understanding of the present invention. It will be appreciated, however, by one skilled in the art that the invention may be practiced without such specific details or optional components and that such description are merely for convenience and illustrating the invention. As such, reference to the figures showing embodiments of the present invention is made to describe the invention and not to limit the scope of the disclosure and claims herein.

Figure 1:
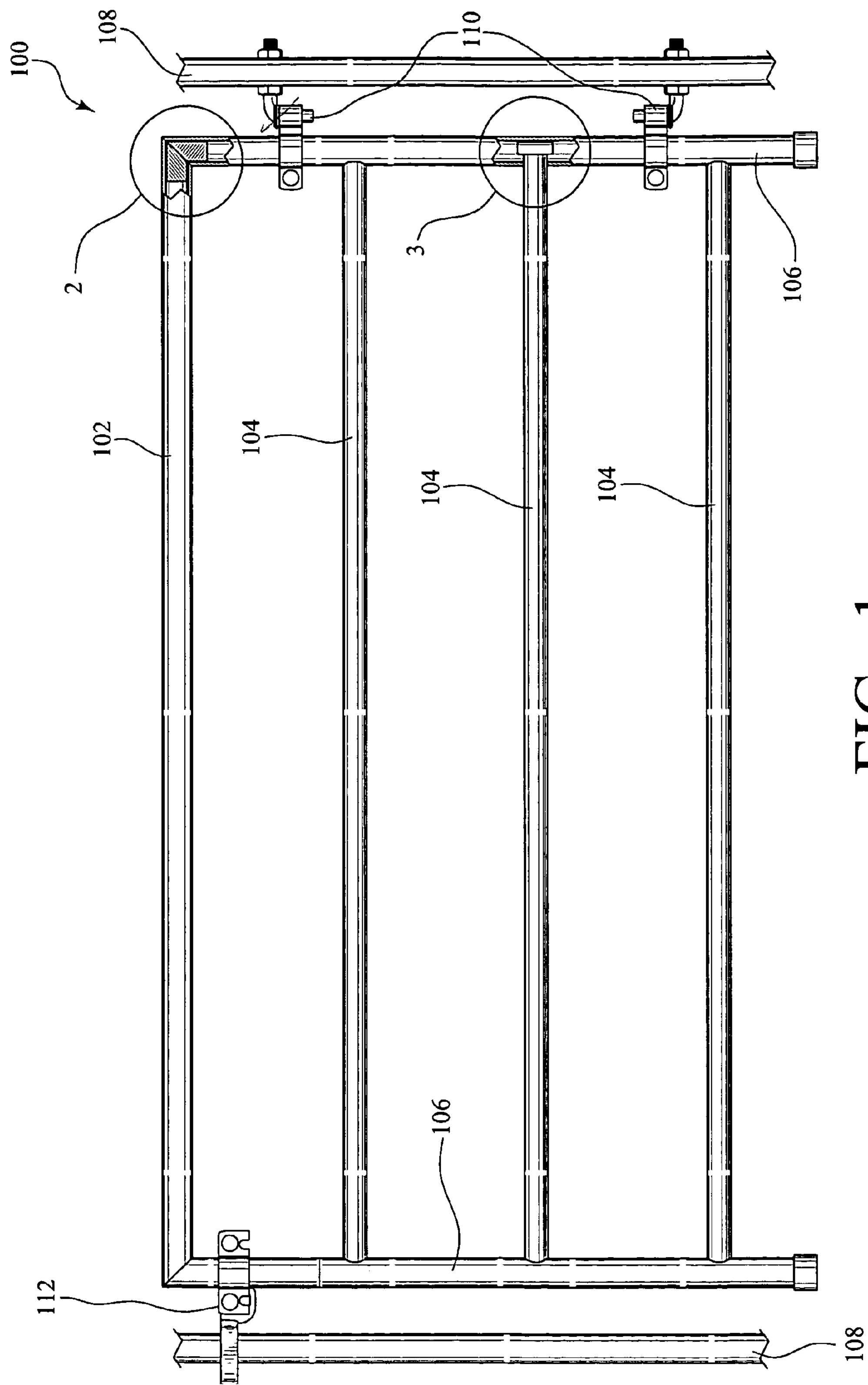
FIG. 1 is a front partial cutaway view of an embodiment of a gate having internal connector assemblies for tubular members.

FIG. 1 shows gate 100 having cutaway sections 2 and 3 where cutaway section 2 shows an embodiment of a corner internal connector assembly and cutaway section 3 shows an embodiment of a "T" internal connector assembly. Fence posts 108 are substantially vertically mounted in soil having a space there between where gate 100 is mounted. One fence post 108 has hinges 110 hingedly attaching gate 100. The other fence post 108 has a latch 112 holding gate 100 in a closed position. Gate 100 has two substantially vertically oriented receiving tubes 106 that receive extending tubes 104. The diameter of receiving tubes 106 is larger than the diameter of extending tubes 104 to receive extending tube 104 therein. Upper tube 102 preferably has a diameter substantially the same as receiving tubes 106.

Gate 100 is an example of an apparatus of the present invention incorporating embodiments of the internal connectors of the present invention. Other apparatuses may include gate and fence systems such as livestock systems, furniture, docks, hand-rails, and other apparatuses, articles, or devices in which a removable internal connector assembly is desirable. Tubes 102, 104, and 106 are preferably comprised of a metallic or polymeric material and more preferably are corrosion resistant. Polyvinyl chloride, polyethylene, polybutylene, polypropylene, acrylonitrile-butadiene-styrene, stainless steel, and aluminum are examples of such preferable materials. In this embodiment shown, tubes 102, 104, and 106 have a hollow center and may have a rounded or rectangular cross-sectional shape. However, tubes 102, 104, and 106 may be solid and have any cross-sectional configuration without departing from the instant invention.

Figure 2:
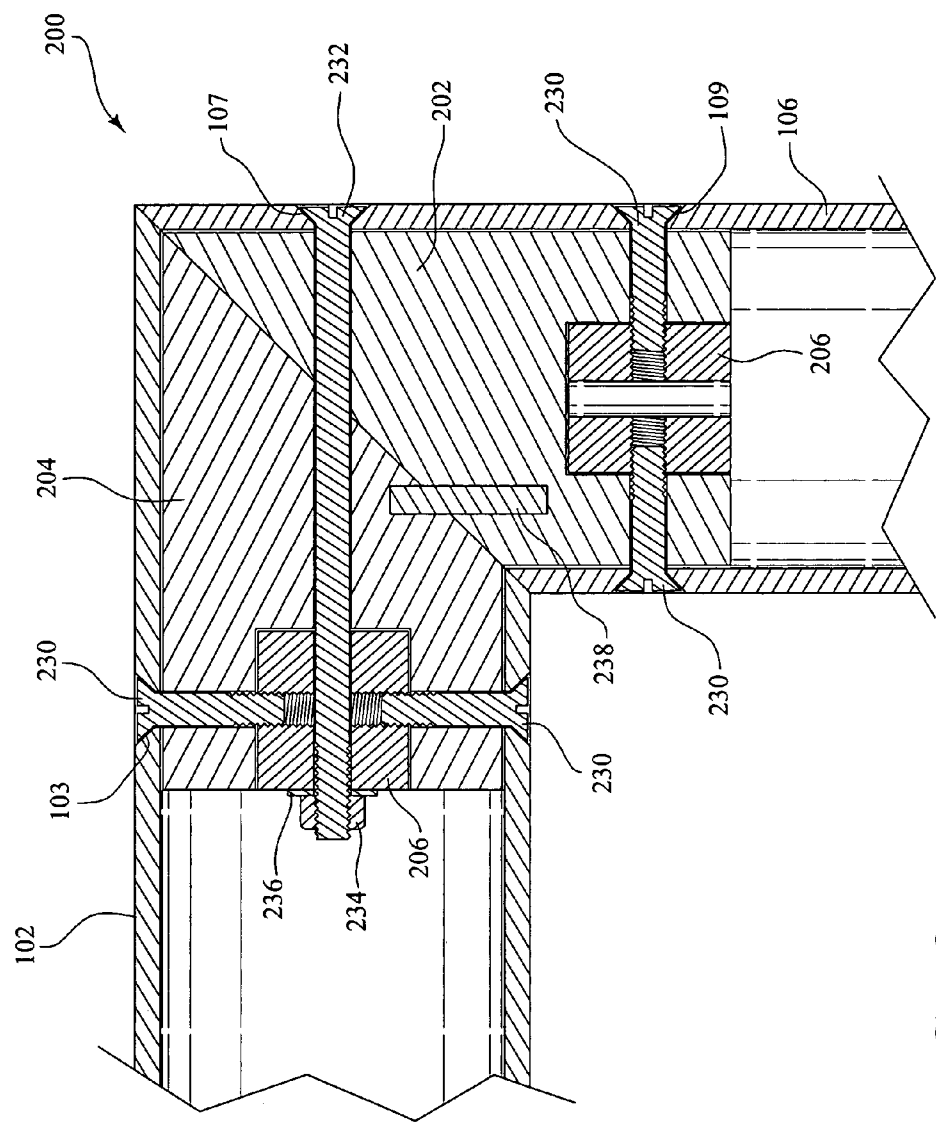
FIG. 2 is a cross-sectional view of an embodiment of a corner internal connector assembly incorporated in the gate of FIG. 1.

FIG. 2 shows a cross-sectional view of corner internal connector assembly 200 joining upper tube 102 with receiving tube 106. A first connector 204 and a second connector 202 each have an angular mating surface, in this embodiment these mating surfaces are about 45° forming a corner of about 90° when mated. First and second connectors 202 and 204 have an outer surface coincident with an inner surface of receiving tube 106 and upper tube 102 respectively allowing a slidingly engagement of first connector 204 with upper tube 102 and second connector 202 with receiving tube 106. Upper tube 102 and receiving tube 106 have mating surfaces of about 45° forming a corner of about 90° when mated. Upper tube 102 has fastener opening 103 extending through the side wall for slidingly receiving fasteners 230. Receiving tube 106 has fastener opening 109 extending through the side wall for slidingly receiving fasteners 230. First connector 204 and second connector 202 each have a centrally oriented counter sink opposite angular mating surfaces. Received within the counter sinks are securing members 206. Securing members 206 have a centrally oriented axial opening and a centrally oriented radial opening extending there through. The radial opening has a fastener engaging means. In this embodiment, the fastener engaging means is a thread for threadingly engaging fasteners 230. Optional dowel 238 engages extends between mating surfaces and into mating apertures within first connector 204 and second connector 202 providing rotational support there between. Fastener 232 extends through fastener opening 107, an upper radial aperture in second fastener 202, an axial aperture in first connector 204, through the centrally oriented axial aperture in securing member 206, and removeably secured with washer 236 and nut 234. Fasteners 230 extend through fastener openings 109 and 103 and removeably engage the fastener engaging means in the radial openings in securing members 206 removeably securing upper tube 102 with receiving tube 106.

Figure 2A:
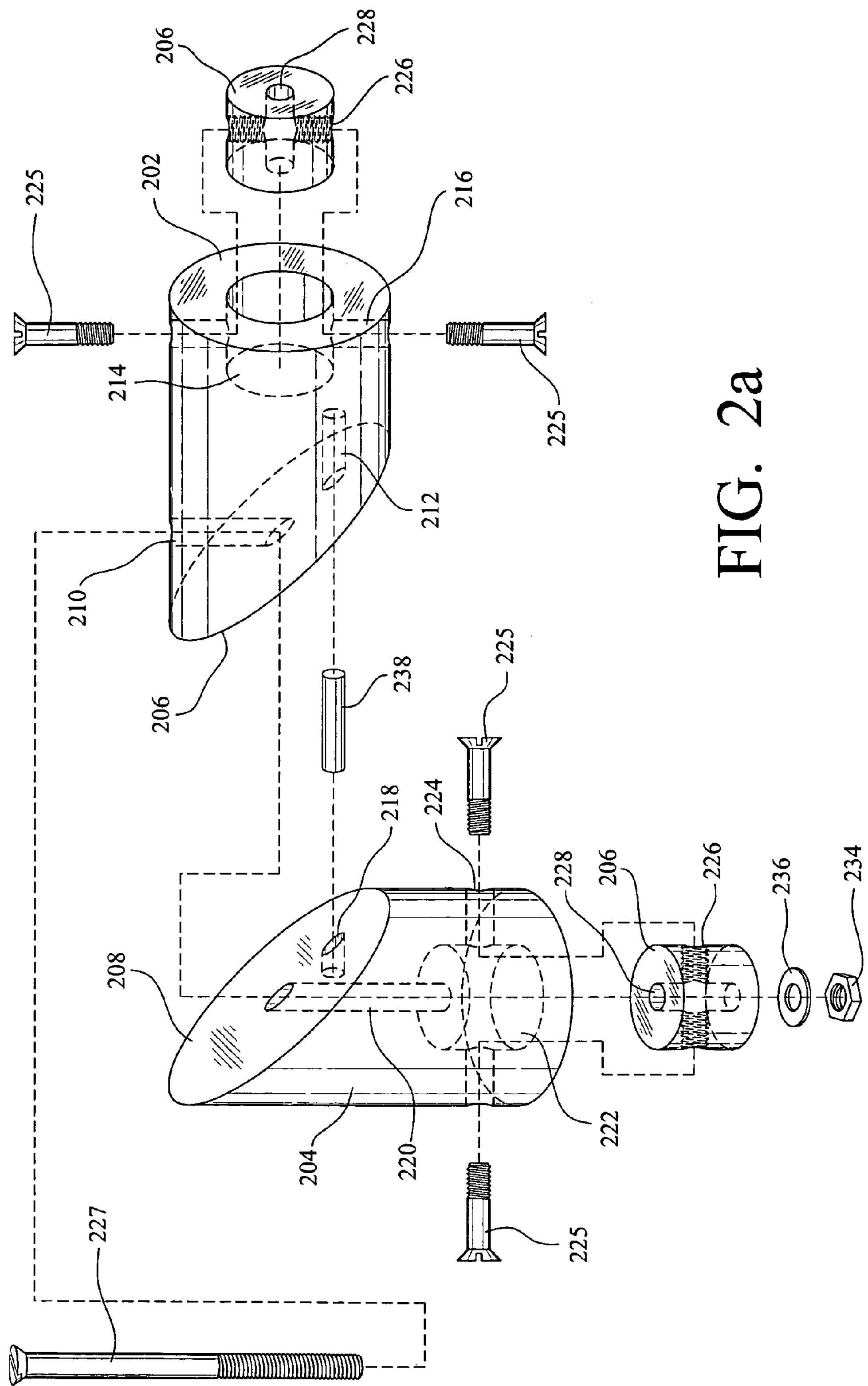
FIG. 2*a* is an exploded view of an embodiment of a corner internal connector assembly incorporated in the gate of FIG. 1.

FIG. 2*a* shows an exploded view of corner internal connector assembly 200. First connector 204 has angular mating surface 208, in this embodiment this mating surface is about 45°. It is to be understood that mating surface 208 may have any angle for forming a desired angle between two removeably secured tubes. In this embodiment first connector 204 has a round outer surface. It is to be understood that the outer surface of first connector 204 may be rectangular or have any shape that is coincident with an inner surface of a tube being connected there to. First connector 204 has centrally oriented counter sink 222 opposite angular mating surface 208. An optional dowel aperture 218 extends radially into angular surface 208. Axial aperture 220 extends from a central portion of angular mating surface 208 to a central portion of counter sink 222. Radial aperture 224 extends through a central portion of counter sink 222.

Second connector 202 has angular mating surface 206 for matingly engaging angular surface 206. Second connector 202 has centrally oriented counter sink 214 opposite angular mating surface 206. An optional dowel aperture 212 extends axially into angular surface 206 aligning with dowel aperture 218 when mating surfaces 208 and 206 are so mated. Radial aperture 216 extends through a central portion of counter sink 214. Upper radial aperture 210 extends radially from a central portion of angular surface 206 in second fastener 202 and mates with axial aperture 220 in first connector 204 forming a fastener opening there through.

A securing member 206 is received in each counter sink 222 and 214. Securing member 206 has a centrally oriented axial opening 228 and a centrally oriented radial opening 226 having a fastener engaging means extending there through. Fastener 227 is placed within radial aperture 210, axial aperture 220, axial opening 228, and washer 236 from where it extends and removeably secures with nut 234. Two fasteners 225 are fastened within each securing member 206 with fastener retaining means 226 removeably securing a tube to the outer circumference of each connector 202 and 204.

Figure 3:
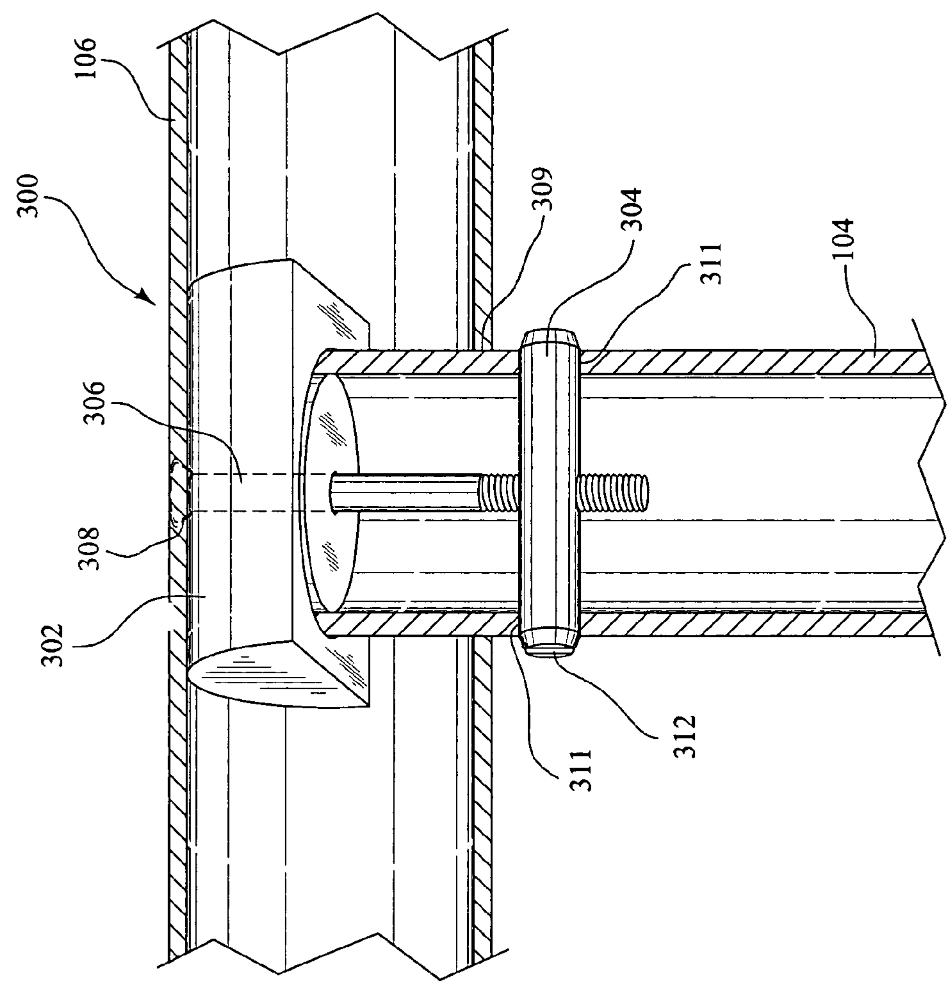
FIG. 3 is a cutaway view of the gate of FIG. 1 showing an embodiment of a "T" internal connector assembly incorporated therein.

FIG. 3 shows "T" internal connector assembly 300 removeably holding receiving tube 106 to extending tube 104. Receiving tube 106 has a receiving opening 309 and an opposite fastener opening 308 in a sidewall thereof. Extending tube 104 is removeably positioned within receiving opening 309 in receiving tube 106. Receiving opening 309 is coincident in size and shape as the outer surface of extending tube 104 allowing extending tube 104 to slide into receiving opening 309. In this embodiment receiving tube 106, extending tube 104, and receiving opening 309 are substantially round. Securing member 304 slidingly extends radially through opposing apertures 311 in the sidewall of extending tube 104. Preferably, securing member 304 is external of receiving tube 106. Receiver 302 has a rounded top surface coincident in size and shape as the inside surface of receiving tube 106. Fastener 306, a screw in the embodiment shown, removeably extends through fastener opening 308 in receiving tube 106 and through receiver 302 where it threadingly engages securing member 304. "T" internal tube connector 300 removeably secures receiving tube 106 to extending tube 104 in a substantially normal orientation. Also shown here is optional aligning slot 312 in an end of securing member 304 for visual and/or tool aligning a radially oriented receiving aperture in securing member 304 with fastener 306.

Figure 3B:
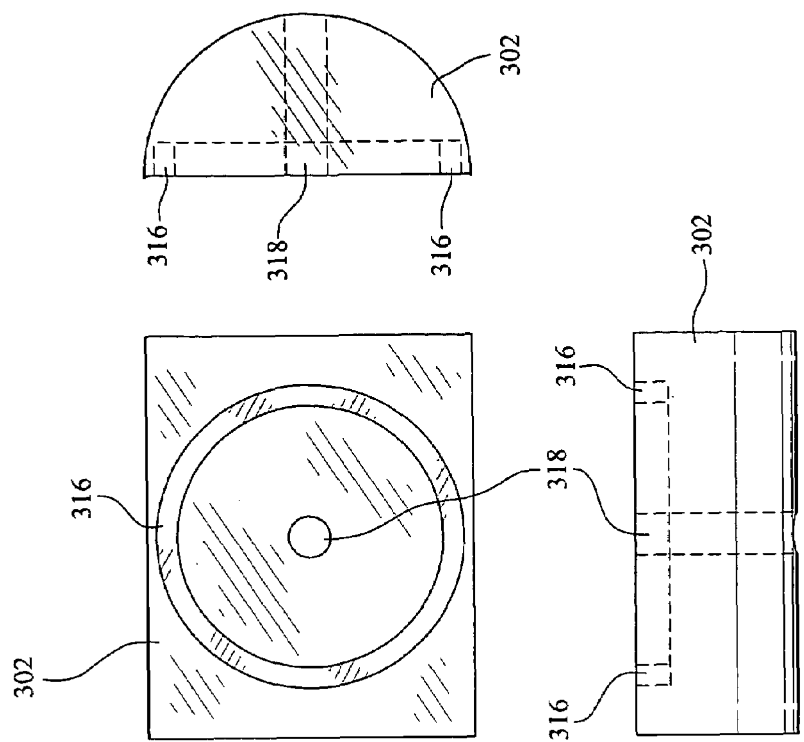
FIG. 3*b* is a bottom, side and end view of an embodiment of the receiver shown in FIG. 3.
Figure 3A:
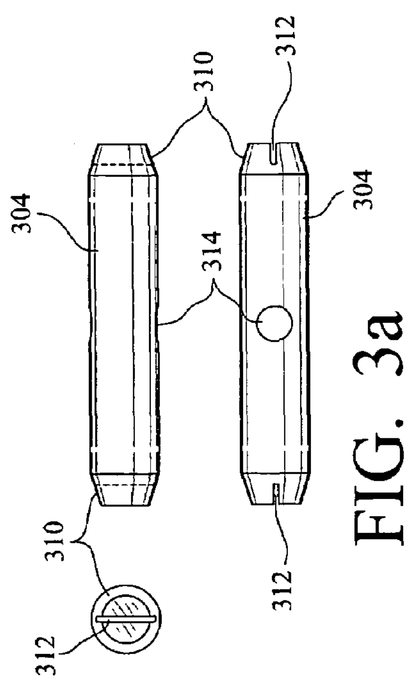
FIG. 3*a* is an end, side and top view of an embodiment of the securing member shown in FIG. 3.

FIG. 3*a* shows an end, side, and top view of an embodiment of the securing member 304. Securing member 304 has a centrally oriented fastener receiving aperture 314 extending radially there through. In this embodiment, securing member 304 is a threaded dowel having optional tapered ends 310 for efficiently inserting into opposing apertures 311 in the sidewall of extending tube 104. Also shown here are optional aligning slots 312 in the ends of securing member 304. Preferably, at least one end 310 of securing member 304 has an aligning slot 312 for visual and/or tool aligning a radially oriented receiving aperture 314 in securing member 304 with a fastener 306. In this embodiment the threads in a threaded dowel 304 are aligned with a threaded screw 306. However, it is to be understood that any fastener 306 and securing member 304 known by a person having ordinary skill in the art for removeably securing fastener 306 to securing member 304 may be used without departing from the present invention.

Figure 3C:
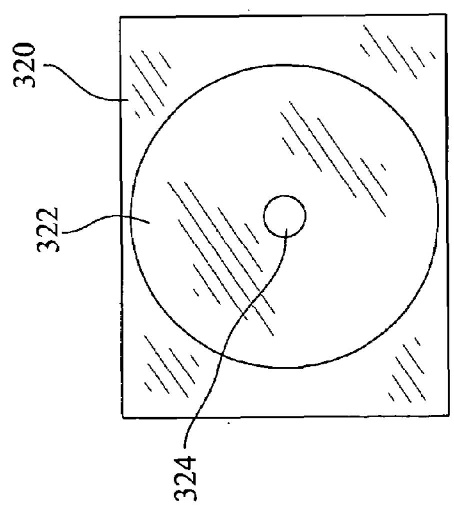
FIG. 3*c* is a bottom view of an embodiment of the receiver having a counter sink bore.

FIG. 3*b* shows a bottom, side and end view of receiver 302. Receiver 302 has fastener aperture 318 where fastener 306 passes there through. Receiving indentation 316, in the form of a circular trough in the embodiment shown here, has a configuration coincident with a cross section of extending tube 104 for receiving an end portion of extending tube 104 and is concentrically oriented about radially oriented fastener aperture 318. FIG. 3*c* shows an alternative embodiment of a receiver 320 where receiving indentation 322 is in the form of a counter bore concentrically oriented about radially oriented fastener aperture 324.

Figure 4:
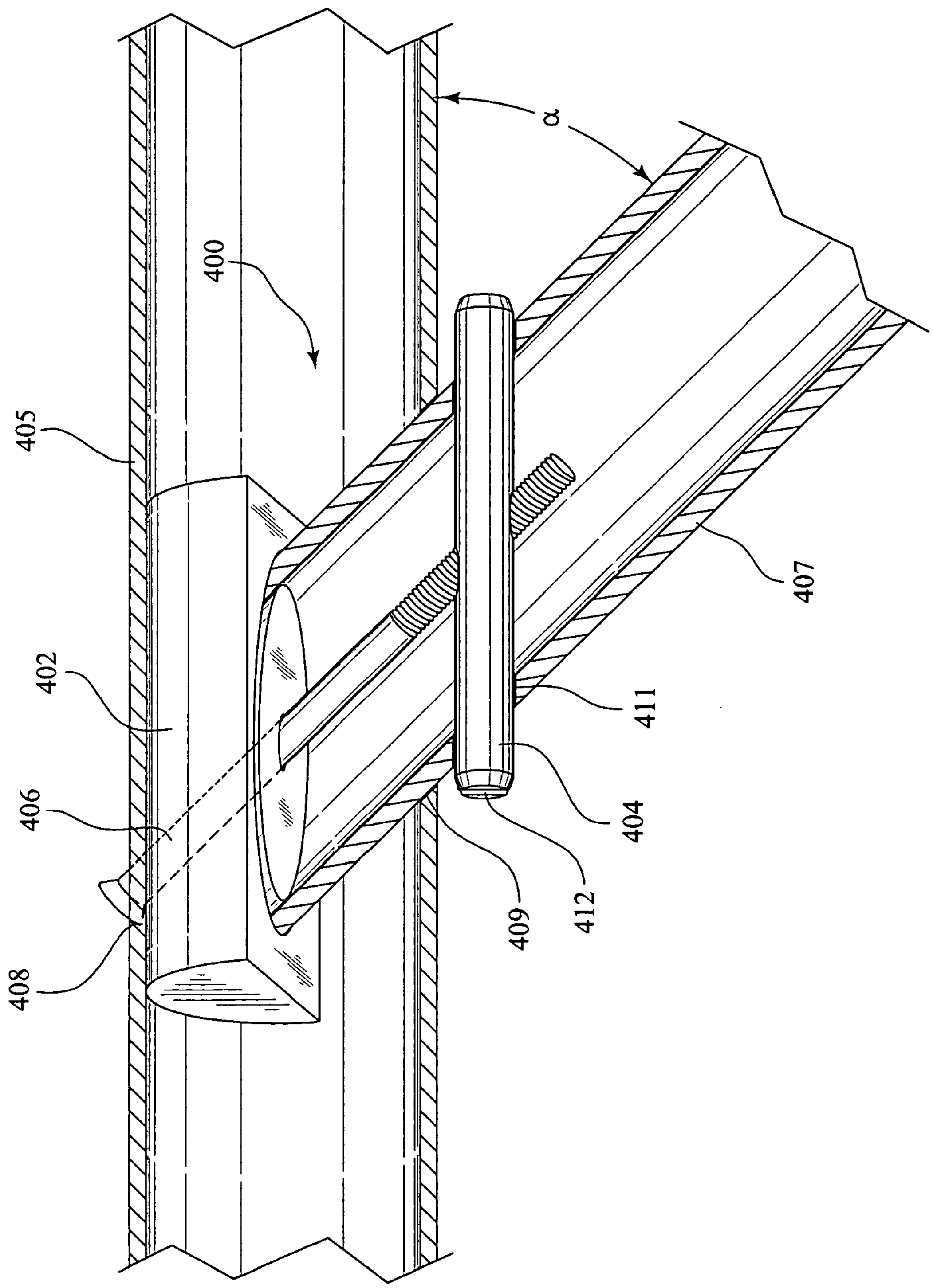
FIG. 4 is a cutaway view of tubular members having a non-normal connection showing another embodiment of an internal connector.

FIG. 4 shows a cutaway view of tubular members 405 and 407 having a non-normal connection. In this embodiment, internal connector assembly 400 forms an angle $\alpha$ between receiving tube 405 and extending tube 407 of less than 90°. Angle $\alpha$ is preferably 30° or 60° and more preferably 45°. Internal connector assembly 400 removeably holds receiving tube 405 to extending tube 407. Receiving tube 405 has a receiving opening 409 and a fastener opening 408 in a sidewall thereof. Extending tube 407 is removeably positioned within receiving opening 409 in receiving tube 405. Receiving opening 409 has a size and shape for receiving extending tube 407 at angle $\alpha$ allowing extending tube 407 to slide into receiving opening 409 at angle $\alpha$. In this embodiment receiving tube 405, and extending tube 407 are substantially round. Securing member 404 slidingly extends through apertures 411 in the sidewall of extending tube 407 forming an angle $\alpha$ between securing member 404 and the side wall of extending tube 407. Receiver 402 has a rounded top surface coincident in size and shape as the inside surface of receiving tube 405. Fastener 406 removeably extends through fastener opening 408 in receiving tube 405 and through receiver 402 where it threadingly engages securing member 404. Internal tube connector 400 removeably secures receiving tube 405 to extending tube 407 in a non-normal orientation. Also shown here is optional aligning slot 412 in an end of securing member 404 for visual and/or tool aligning a radially oriented receiving aperture in securing member 404 with fastener 406.

Figure 5:
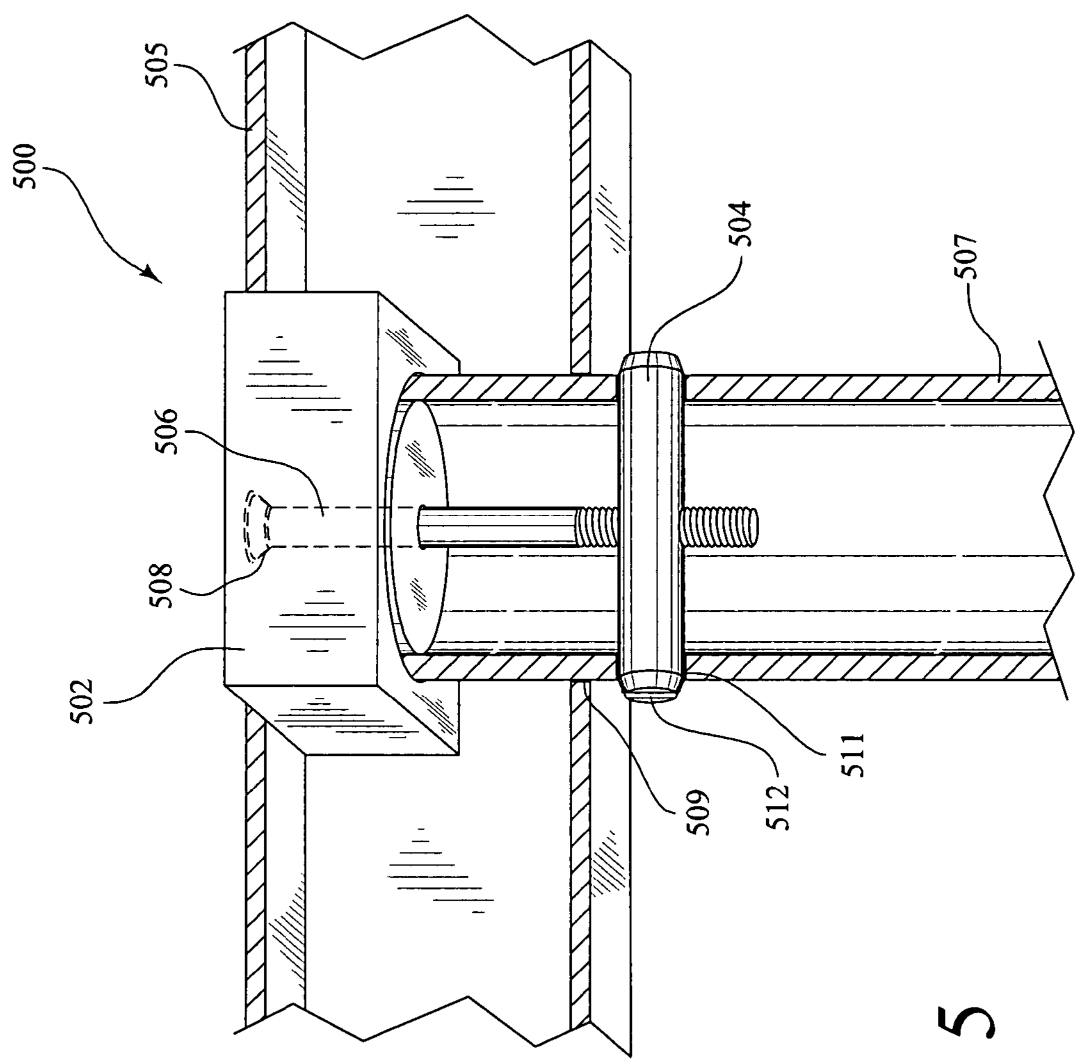
FIG. 5 is a cutaway view of tubular members having different cross-sectional configurations showing another embodiment of a "T" internal connector assembly incorporated therein.

FIG. 5 shows a cutaway view of tubular members 507 and 505 having different cross-sectional configurations incorporating "T" internal connector assembly 500. Tubular member 507 has a substantially round cross-sectional area while tubular member 505 has a substantially rectangular cross-sectional area. In this embodiment, internal connector assembly 500 forms a substantially normal angle between receiving tube 505 and extending tube 507. It is to be understood that an angle of less than 90° can be formed between receiving tube 505 and extending tube 507 by incorporating features shown in FIG. 4. Internal connector assembly 500 removeably holds receiving tube 505 to extending tube 507. Receiving tube 505 has a receiving opening 509 and a fastener opening 508 in a sidewall thereof. Extending tube 507 is removeably positioned within receiving opening 509 in receiving tube 505.

Receiving opening 509 has a size and shape for slidingly receiving extending tube 507 into receiving opening 509. In this embodiment, extending tube 507 and receiving opening 509 have round cross-sectional areas while extending tube 505 has a rectangular cross-sectional area. It is to be understood that extending tube 507 and receiving opening 509 could have rectangular cross-sectional areas while extending tube 505 could have a round cross-sectional area and not depart from the present invention. Securing member 504 slidingly extends through apertures 511 in the sidewall of extending tube 507. Receiver 502 has a rectangular configuration coincident in size and shape as the inside surface of receiving tube 505. Fastener 506 removeably extends through fastener opening 508 in receiving tube 505 and through receiver 502 where it threadingly engages securing member 504. Internal tube connector 500 removeably secures receiving tube 505 to extending tube 507. Also shown here is optional aligning slot 512 in an end of securing member 504 for visual and/or tool aligning a radially oriented receiving aperture in securing member 504 with fastener 506.

Figure 6:
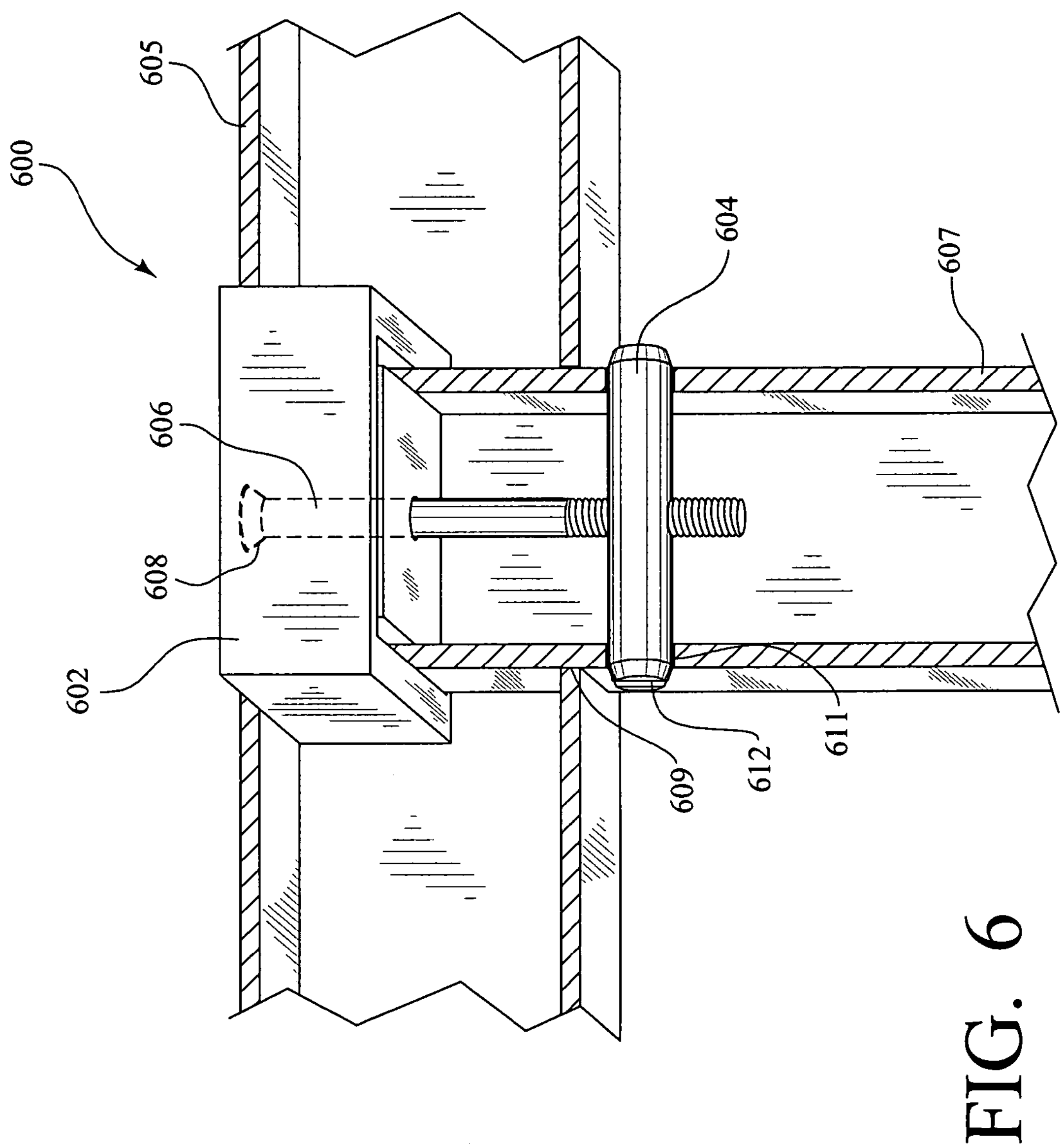
FIG. 6 is a cutaway view of tubular members having rectangular cross-sectional configurations showing yet another embodiment of a "T" internal connector assembly incorporated therein.

FIG. 6 is a cutaway view of tubular members 605 and 607 having rectangular cross-sectional configurations showing yet another embodiment of a "T" internal connector assembly 600. In this embodiment, internal connector assembly 600 forms a substantially normal angle between receiving tube 605 and extending tube 607. It is to be understood that an angle of less than 90° can be formed between receiving tube 605 and extending tube 607 by incorporating features shown in FIG. 4. Internal connector assembly 600 removeably holds receiving tube 605 to extending tube 607. Receiving tube 605 has a receiving opening 609 and a fastener opening 608 in a sidewall thereof. Extending tube 607 is removeably positioned within receiving opening 609 in receiving tube 605. Receiving opening 609 has a size and shape for slidingly receiving extending tube 607 into receiving opening 609. In this embodiment, extending tube 607, receiving tube 605, and receiving opening 609 have rectangular cross-sectional areas. Securing member 604 slidingly extends through apertures 611 in the sidewall of extending tube 607. Receiver 602 has a rectangular configuration coincident in size and shape as the inside surface of receiving tube 605. Fastener 606 removeably extends through fastener opening 608 in receiving tube 605 and through receiver 602 where it threadingly engages securing member 604. Internal tube connector 600 removeably secures receiving tube 605 to extending tube 607. Also shown here is optional aligning slot 612 in an end of securing member 604 for visual and/or tool aligning a radially oriented receiving aperture in securing member 604 with fastener 606.

Figure 7:
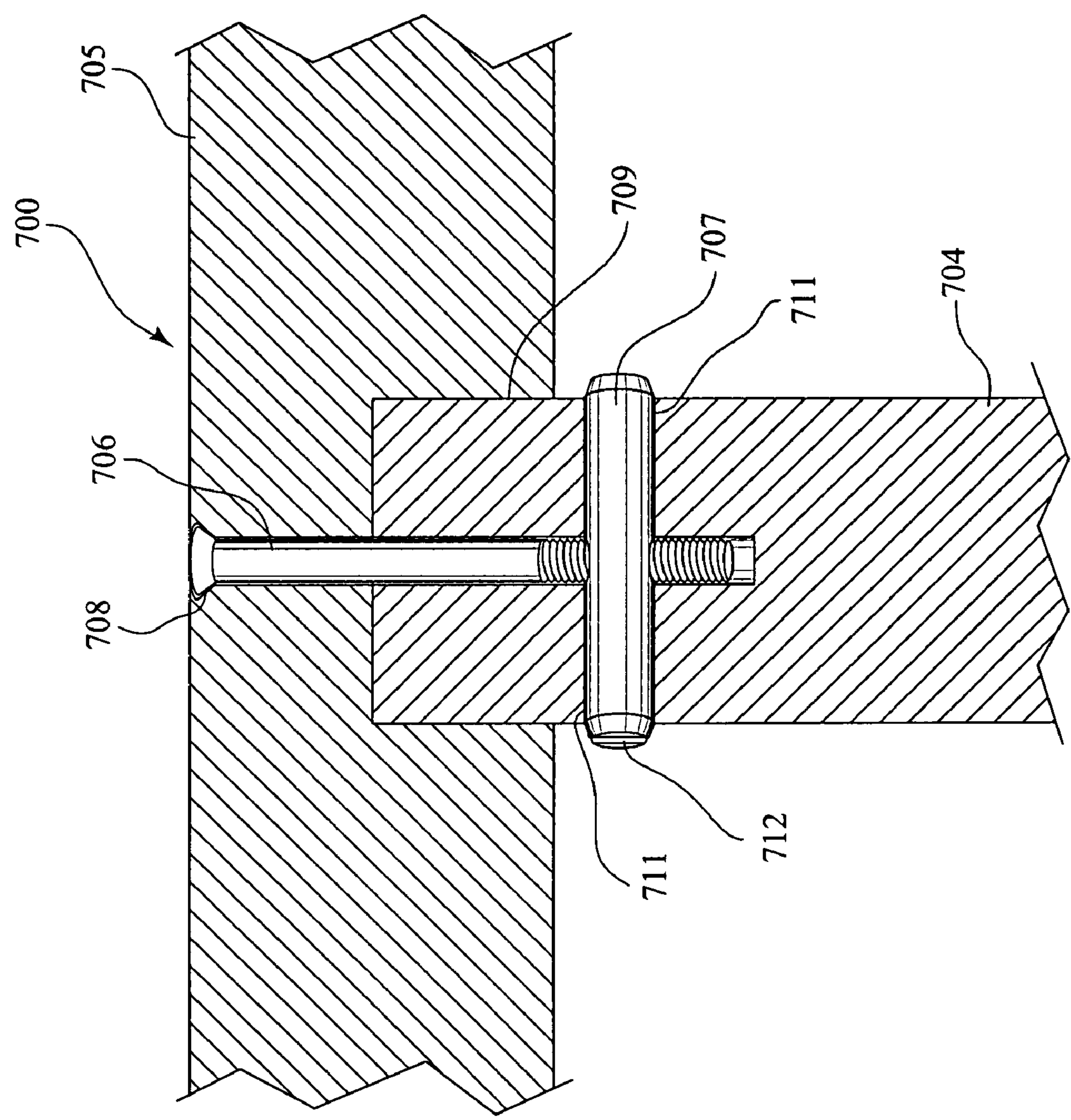
FIG. 7 is a cutaway view of tubular members having a solid configuration showing another embodiment of a "T" internal connector assembly.

FIG. 7 shows tubular members 704 and 706 having a solid configuration and being removeably connected with "T" internal connector assembly 700. In this embodiment, internal connector assembly 700 forms a substantially normal angle between substantially solid receiving tube 705 and extending tube 707. Receiving tube 705 has a receiving opening 709 and a fastener opening 708 in a sidewall thereof. Extending tube 707 is removeably positioned within receiving opening 709 in receiving tube 705. Receiving opening 709 has a size and shape for slidingly receiving extending tube 707 a preselected distance into receiving tube 705. Securing member 704 slidingly extends through aperture 711 in extending tube 707. Internal tube connector 700 removeably secures receiving tube 705 to extending tube 707 with fastener 706 removeably engaging securing member 704. Also shown here is optional aligning slot 712 in an end of securing member 704 for visual and/or tool aligning a radially oriented receiving aperture in securing member 704 with fastener 706.

The present invention is an internal tube connector assembly and apparatuses formed there with. The internal tube connector assembly of the present invention removeably secures hollow or solid tubes together having any desired angle there between.

I claim:

1. An internal tube connector comprising:

a hollow receiving tube having a substantially continuous inside and outside surface, a receiving opening, and a fastener opening in a sidewall thereof;

a hollow extending tube having a substantially continuous inside and outside surface removeably positioned within said receiving opening in said receiving tube, said receiving tube having a greater inner diameter than an outer diameter of said extending tube;

a securing member slidingly extending through opposing apertures in the tubular sidewall of said extending tube, said securing member having a centrally oriented fastener receiving aperture extending therethrough;

a receiver having an outer surface coincident in shape with and engaging said inside surface of said receiving tube, said receiver having a centrally oriented fastener opening; and a fastener removeably extending through said fastener opening in said receiving tube and said fastener aperture in said receiver, said fastener being removeably secured in said fastener receiving aperture in said securing member.

2. The internal tube connector of claim 1 wherein said receiving tube and said extending tube form an angle $\alpha$ there between, wherein said angle $\alpha$ is less than 90°.

3. The internal tube connector of claim 1 wherein said receiving tube and said extending tube form an angle $\alpha$ there between, wherein said angle $\alpha$ is approximately 90°.

4. The internal tube connector of claim 1 wherein said securing member has an aligning slot in at least one end there of.

5. The internal tube connector of claim 1 wherein said securing member is external of said receiving tube.

6. The internal tube connector of claim 1 wherein said receiver has a receiving indentation in the form of a slot suitable to receive an end of said extending tube.

7. The internal tube connector of claim 6 wherein said receiving indentation is a circular bore.

8. The internal tube connector of claim 1 wherein said receiving and extending tubes are comprised of a corrosion resistant material.

9. The internal tube connector of claim 1 wherein said securing member is a threaded dowel.

10. The internal tube connector of claim 1 wherein at least one of said extending tube and said receiving tube has a substantially round cross-sectional configuration.

11. The internal tube connector of claim 1 wherein at least one of said extending tube and said receiving tube has a substantially rectangular cross-sectional configuration.

12. The internal tube connector of claim 1 wherein said receiver is semi-cylindrical.

13. A gate comprised of:

two opposing hollow tubular support members wherein each of said support members has at least one receiving opening and corresponding opposite fastener opening in a sidewall thereof, each of said corresponding fastener and receiving openings in one of said opposing support members substantially horizontally aligning in a facing relationship with a corresponding fastener and receiving opening in the other of said two opposing support members, at least one hollow tubular cross member connecting said two opposing support members wherein each of said cross members extends into a facing set of said substantially horizontally aligning receiving openings, a securing member near each end of said at least one cross member slidingly extending radially through opposing apertures in the tubular sidewall of said at least one cross member, said securing member having a centrally oriented fastener receiving aperture extending radially therethrough;

a receiver at each end of said at least one cross member having a top surface coincident with and engaging the inside surface of each said support member, each said receiver having a centrally oriented fastener opening; and a fastener removeably extending through each of said fastener openings and each of said fastener receiver apertures and removeably secured to each said fastener receiving aperture.

* * * * *